United States Patent [19]
Borth et al.

[11] Patent Number: 4,737,976
[45] Date of Patent: Apr. 12, 1988

[54] HANDS-FREE CONTROL SYSTEM FOR A RADIOTELEPHONE

[75] Inventors: David E. Borth, Palatine; Ira A. Gerson, Hoffman Estates; Richard J. Vilmur, Palatine, all of Ill.

[73] Assignee: Motorola, Inc., Schaumburg, Ill.

[21] Appl. No.: 59,978

[22] PCT Filed: Sep. 3, 1985

[86] PCT No.: PCT/US85/01672
§ 371 Date: Sep. 3, 1985
§ 102(e) Date: Sep. 3, 1985

[87] PCT Pub. No.: WO87/01546
PCT Pub. Date: Mar. 12, 1987

[51] Int. Cl.⁴ .............................................. H04B 1/40
[52] U.S. Cl. .................................... 379/58; 379/63; 379/89; 381/46
[58] Field of Search ............... 379/89, 63, 58, 56, 379/60, 59; 381/42, 43, 46, 47; 455/33, 79, 54

[56] References Cited

U.S. PATENT DOCUMENTS

| | | | |
|---|---|---|---|
| 3,588,363 | 6/1971 | Herscher et al. | 179/15 A |
| 3,742,143 | 6/1973 | Awipi | 179/1 SA |
| 4,185,168 | 1/1980 | Graupe et al. | 179/1 P |
| 4,348,550 | 9/1982 | Pirz et al. | 379/357 |
| 4,373,116 | 2/1983 | Shimizu et al. | 179/1 SM |
| 4,378,603 | 3/1983 | Eastmond | 455/79 |
| 4,400,584 | 8/1983 | Vilmur | 179/1 FS |
| 4,426,733 | 1/1984 | Brenig | 455/79 |
| 4,454,384 | 6/1984 | Ferrieu et al. | 179/81 B |
| 4,459,674 | 7/1984 | Sakurai | 364/513.5 |
| 4,461,025 | 7/1984 | Franklin | 381/56 |
| 4,520,576 | 6/1985 | Vander Molen | 34/45 |

FOREIGN PATENT DOCUMENTS

| | | |
|---|---|---|
| 0041195 | 6/1981 | European Pat. Off. . |
| 0059952 | 3/1982 | European Pat. Off. . |
| 0093303 | 4/1983 | European Pat. Off. . |
| 2114401A | 1/1983 | United Kingdom . |

OTHER PUBLICATIONS

"Mike Talks Back", Centigram Corp., advertisement, *Telecommunications*, vol. 15, No. 8, p. 43.

"Applying Automatic Speech-Recognition to Data Entry", M. Rothberg, *Mini-Microsystems*, 11/80, pp. 153 & 154.

Boll, Steven F., "Suppression of Acoustic Noise in Speech Using Spectral Subtraction", IEEE Trans. on Acoust., Speech and Signal Processing, vol. ASSP-27, No. 2, Apr. 1979, pp. 113-120.

Bridle, John S., et al., "An Algorithm for Connected Word Recognition", IEEE International Conference on Acoust., Speech, and Signal Processing, May 3-5, 1982, vol. 2, pp. 899-902.

(List continued on next page.)

*Primary Examiner*—Robert Lev
*Attorney, Agent, or Firm*—Douglas A. Boehm; Anthony J. Sarli, Jr.; Charles L. Warren

[57] ABSTRACT

An improved hands-free user-interactive control and dialing system is disclosed for use with a speech communications device. The control system (400) includes a dynamic noise suppressor (410), a speech recognizer (420) for implementing voice-control, a device controller (430) responsive to the speech recognizer for controlling operating parameters of the speech communications device (450) and for producing status information representing the operating status of the device, and a speech synthesizer (440) for providing reply information to the user as to the speech communications device operating status. In a mobile radiotelephone application, the spectral subtraction noise suppressor (414) is configured to improve the performance of the speech recognizer (424), the voice quality of the transmitted audio (417), and the audio switching operation of the vehicular speakerphone (460). The combination of noise processing, speech recognition, and speech synthesis provides a substantial improvement to prior art control systems.

48 Claims, 3 Drawing Sheets

OTHER PUBLICATIONS

Crump, Stuart, Jr., "Don't Touch That Dial!", Personal Communications Magazine, Jun. 1985, pp. 43–47.

Holmes, J. N., "The JSRU Channel Vocoder", IEE Proc., vol. 127, Part F., No. 1, Feb. 1980, pp. 53–60.

Kitsopoulos, S. C., et al., "Experimental Telephone Lets Disabled 'Dial' by Voice", Bell Laboratories Record, Oct. 1973, pp. 272–277.

Klatt, Dennis H., "A Digital Filter Bank for Spectral Matching", IEEE International Conference on Acoust., Speech, and Signal Processing, 1976, pp. 573–576.

Lim, Jae S., et al., "Enhancement and Bandwidth Compression of Noisy Speech", Pro. IEEE, vol. 67, No. 12, Dec. 1979, pp. 1586–1604.

Martin, Thomas B., "Practical Applications of Voice Input to Machines", Proc. IEEE, vol. 64, No. 4, Apr. 1976, pp. 487–501.

McAulay, Robert J., et al., "Speech Enhancement Using a Soft-Decision Noise Suppression Filter", IEEE Trans. Acoust., Speech, Signal Processing, vol. ASSP-28, No. 2, Apr. 1980, pp. 137–145.

Neben, G., "The Performance of an Isolated Word Recognizer Using Noisy Speech", Technical Report 647, Lincoln Laboratory, Massachusetts Institute of Technology, Apr. 13, 1983.

Peckham, J., et al., "A Real-Time Hardware Continuous Speech Recognition System", IEEE International Conference on Acoust., Speech, and Signal Processing, May 3–5, 1982, vol. 2, pp. 863–866.

Rabiner, L. R., et al., "Application of Isolated Word Recognition to a Voice Controlled Repertory Dialer System", IEEE Trans. Acoust., Speech, Signal Processing, vol. ASSP-28, Apr. 1980, pp. 182–185.

Tsuruta, Shichiro, et al., "DP-100 Connected Speech Recongition System", Proc. 1979 INTELCOM Exposition, Dallas, Texas, Feb. 26–Mar. 2, 1979, pp. 48–52.

M. Immendorfer, et al., "Sprachgesteuertes Telefon mit Elektronischem Telefonregustersoeuoger", Nachrichtentechnische Zeitschrift N.T.Z., vol. 37, No. 8, Aug. 1984, Berlin, pp. 496–499.

E. Teja, "Repertory Telephone Dialer Responds to Human Voice", EDN, vol. 25, No. 19, Oct. 1980, Boston, Mass., pp. 57–59.

M. Immendorfer, "Voice Dialer", Electrical Communication, vol. 59, No. 3, Mar. 1985, Harlow, Essex, pp. 281–285.

Fig. 3

HANDS-FREE CONTROL SYSTEM FOR A RADIOTELEPHONE

BACKGROUND OF THE INVENITON

The present invention relates generally to speech recognition control systems, and more particularly to a hands-free telephone control and dialing system especially suited for use in a noisy environment such as encountered in a vehicular radiotelephone application.

In both radio and landline telephone systems, the user typically communicates by means of a handset that includes a speaker at one end which is placed close to the user's ear, and a microphone at the other end which is held close to the user's mouth. In operation, one hand of the user is occupied holding the telephone handset in its proper orientation, thereby leaving the user's only free hand to accomplish tasks such as driving a vehicle. In order to provide a greater degree of freedom for the user, speakerphones have commonly been used in landline telephone systems. Recently, vehicular speakerphones (VSP's) have been developed for use in automobiles. For example, U.S. Pat. No. 4,378,603 by Eastmond and U.S. Pat. No. 4,400,584 by Vilmur, both assigned to the same Assignee as the present invention, describe vehicular speakerphones with hands-free operation.

Hands-free control systems which are responsive to human voice are disclosed in a number of U.S. patents. U.S. Pat. No. 4,520,576 by Vander Molen discloses a conversational voice command control system for a home appliance such as a clothes dryer. The control system recognizes voice commands and emits synthesized speech sounds, in an interaction with the user, to obtain the information necessary for setting the operating parameters. Speech recognition and speech synthesis have also been applied to radio transceiver control functions (on/off, transmit/receive, volume and squelch control, etc.) in U.S. Pat. No. 4,426,733 by Brenig. Additionally, U.S. Pat. No. 4,348,550 by Pirz et al. discloses a repertory dialing circuit for a telephone system which is controlled by the user's spoken word.

However, the application of hands-free control to a vehicular speech communications system, such as a mobile radiotelephone, introduces several significant obstacles. When speech recognition is utilized in a vehicular environment, the high degree of ambient noise inherent in a vehicle presents a considerable problem to reliable voice control. Furthermore, a vehicular speakerphone typically has a microphone that is distant from the user's mouth, such as being mounted overhead on the automobile sun visor. Consequently, the required high microphone sensitivity causes a large increase in the amount of environmental background noise being applied to the speech recognizer, as well as being transmitted to the landline party.

Numerous approaches to this noisy speech problem have been attempted, with only limited success. For example, it is well known that speech may be enhanced in an aircraft through the use of a separate microphone, located at a distance away from the user's first microphone, such that it picks up only background noise. The general characteristics of the background noise can then be removed by subtracting an estimate of the background noise from the desired signal. This technique has been shown to provide a limited improvement in signal-to-noise ratio (SNR). However, it is very difficult to achieve the required isolation of the second microphone from the speech source while at the same time attempting to pick up the same background noise environment as the first microphone.

A simple high-pass filter is often used, perhaps in a microphone preamplifier, to reduce low frequency background noise. This may generally be perceived as an improvement in voice quality, but does little to improve the speech recognition process. Another approach, that of spectral subtraction noise suppression, has typically been used as a noise pre-processor to enhance the noise-degraded speech in preparation for further processing by a bandwidth compression system such as a vocoder.

Although the aforementioned prior art techniques may perform adequately under nominal background noise conditions, the performance of these approaches become severely limited when used in specialized applications such as vehicular speakerphones. The more distant microphone delivers a much poorer signal-to-noise level to the land-end party due to road and wind noise conditions. In rapidly-changing high noise automobile environments, vehicular background noise may cause an automobile's speech recognition control system to malfunction. Furthermore, the performance of speakerphone audio switching circuitry may be significantly impaired in such environments.

A need, therefore, exists for an improved hands-free control system for a mobile radio transceiver that provides sufficient background noise attenuation in high ambient noise environments.

SUMMARY OF THE INVENTION

Accordingly, it is a general object of the present invention to provide an improved method and apparatus for controlling a speech communications device in a noisy environment.

A more particular object of the present invention is to provide an improved hands-free user-interactive control and dialing system for a mobile radiotelephone.

A further object of the present invention is to improve the performance of the radiotelephone's speech recognition control system, the voice quality of the transmitted audio, and the audio switching operation of the vehicular speakerphone.

In accordance with the present invention, an improved user-interactive control system for a speech communications device is provided such that the user's hands are free to accomplish other tasks. The control system of the present invention includes a means for dynamically suppressing background noise from an input speech signal; a means responsive to the noise suppression means for recognizing user-spoken command words; a means responsive to the speech recognition means for controlling operating parameters of the speech communications device and for producing status information representing the operating status of the device; and a means responsive to such status information for providing an indication to the user as to the speech communications device operating status.

In the preferred embodiment, the hands-free user-interactive control system is used with a mobile radiotelephone employing a vehicular speakerphone. User-spoken input speech is first acoustically coupled to the control system, then noise-processed by a spectral subtraction noise suppressor. The noise-processed speech information is then applied to a speech recognizer which provides operating parameter control signals corresponding to predetermined user-spoken command words. A radio-interfacing control unit utilizes these control signals to dial telephone numbers spoken by the user or recalled from a stored telephone number directory in response to a corresponding command word, to store and recall telephone numbers from this directory, and to control radio functional operation. The control unit also provides status information to a speech synthesizer which provides audible feedback to the user as to the present operating status of the radiotelephone. Furthermore, noise-suppressed speech is used by the vehicular speakerphone to improve its switching performance, and used by the radio transmitter to improve the quality of the transmitted speech.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

DESCRIPTION OF THE PREFERRED EMBODIMENT

Figures 1, 2:
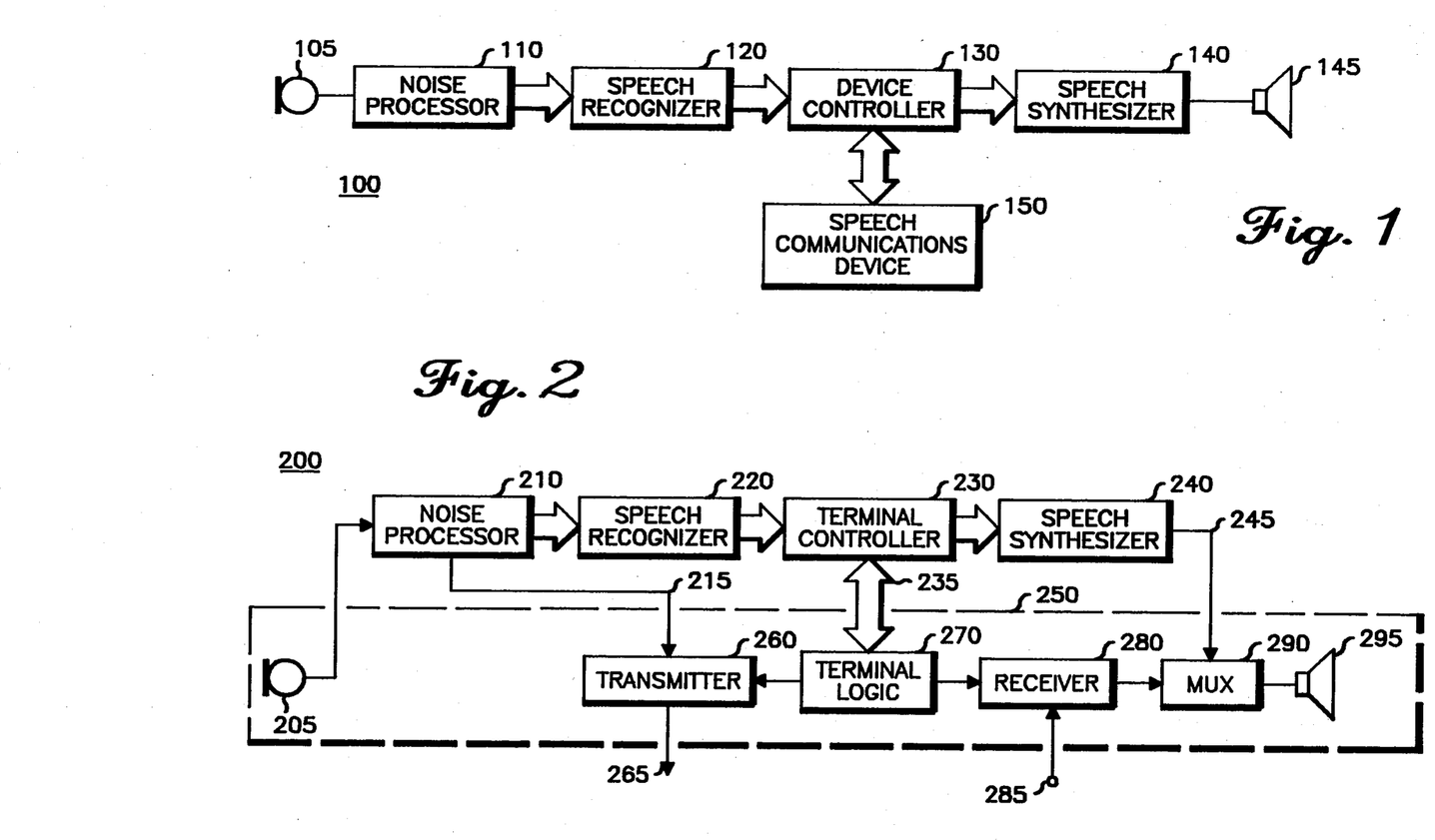
FIG. 1 is a general block diagram of a speech communications device control system according to the present invention.
FIG. 2 is a block diagram of the control system of the present invention applied to a speech communications terminal.

Referring now to the accompanying drawings, FIG. 1 shows a general block diagram of user-interactive control system 100 of the present invention. Speech communications device 150 may include portions of any radio or landline voice communications system, such as, for example, 2-way radio systems, telephone systems, intercom systems, etc. User-spoken input speech is applied to microphone 105, which acts as an acoustic coupler providing an electrical input speech signal for the control system. Noise processor 110 performs dynamic noise suppression upon the input speech signal to provide noise suppression information to speech recognizer 120. Dynamic noise suppression, as used herein, refers to the process of adaptively filtering quasi-stationary background noise (i.e., noise exhibiting a relatively constant long-term power spectrum) from the desired signal. An example of dynamic noise suppression is the spectral subtraction or spectral gain modification technique known in the art. The noise suppression information may be comprised of either noise-suppressed speech itself, spectral subtraction noise suppression parameters to be used in the speech recognizer, or both. A further description of noise processor 110, as well as the spectral subtraction/spectral gain modification technique, may be found in the description of noise processor 410 of FIG. 4.

Speech recognizer 120 utilizes this noise suppression information by either directly performing speech recognition upon noise-suppressed speech, or by utilizing noise suppression parameters in the speech recognition process. Hence, much more accurate speech recognition performance is achieved with knowledge of the noise content of the speech signal. A further discussion of an appropriate speech recognition apparatus, and how the preferred embodiment incorporates noise suppression data into the speech recognizer, may be found in the description accompanying FIG. 4.

Device controller 130 interfaces the control system to speech communications device 150. Device controller 130 translates device control data provided by speech recognizer 120 into control signals that can be recognized by the particular speech communications device. These control signals direct the device to perform specific operating functions as instructed by the user. A example of a device controller known in the art and suitable for use with the present invention is a microprocessor.

Device controller 130 also provides device status data representing the operating status of speech communications device 150. This data is applied to speech synthesizer 140, and translated into user-recognizable speech when output via speaker 145. As will be apparent to those skilled in the art, other means to provide an indication to the user as to the speech communications device operating status may be utilized. Such indication may include a visible display (LED, LCD, CRT, etc.) or a sound transducer (tone generator or other audible signal). Thus, FIG. 1 illustrates how the present invention provides a user-interactive control system utilizing noise suppression, speech recognition, and speech synthesis to control the operating parameters of a speech communications device.

FIG. 2 illustrates the application of the user-interactive control system to a speech communications terminal, such as, for example, a telephone terminal, a communications console, a 2-way radio, etc. Noise processor 210, speech recognizer 220, terminal controller 230, and speech synthesizer 240, are the same in structure and operation as the corresponding blocks of FIG. 1. However, control system 200 further illustrates the internal structure of speech communications terminal 250. In this embodiment, microphone 205 and speaker 295 are incorporated into the speech communications terminal itself. A typical example of this microphone/speaker arrangement would be a telephone handset. Speech communications terminal 250 also has a transmitter block 260 coupled to a transmit path 265, a receive block 280 coupled to a receive path 285, and a terminal logic block 270 for controlling both the transmitter and receiver blocks. Terminal logic block 270 typically has access to the operating status information of speech communications terminal 250, and interfaces this information to terminal controller 230 via terminal interface path 235.

The example of a "smart" telephone terminal employing voice-controlled dialing from a stored telephone number directory is now used to describe the operation of the control system of the present invention. Initially, the user speaks a verbal command into microphone 205, such as the command word "recall". The utterance is first noise-processed by noise processor 210, then recognized as a valid user command by speech recognizer 220. In this example, terminal controller 230 then directs speech synthesizer 240 to generate the verbal reply "name?" via speech synthesis output line 245 through multiplexer 290 to speaker 295. (For details of multiplexer 290, refer to the description of multiplexer 470 of FIG. 4.) The user then responds by speaking a word such as "office"—a name in the directory index corresponding to a telephone number that he desires to dial. The word will be recognized as a valid command word if it corresponds to a predetermined name index stored in the terminal controller telephone number directory. If valid, controller 230 directs speech synthesizer 240 to reply "office" thereby confirming the recognized command word.

The user then says the command word "send", which when recognized by the control system, instructs terminal controller 230 to obtain the telephone number corresponding to the name "office" and send telephone number dialing information to terminal logic block 270 via terminal interface path 235. Terminal logic block 270 outputs this dialing information along transmit path 265 via transmitter 260. When the telephone connection is made, terminal receiver 280 provides audio from receive path 285 to speaker 295 via multiplexer 290. If a proper telephone connection cannot be made, terminal controller 230 reads the status of terminal logic block 270 and generates status information, such as the reply word "busy", to be output to the user via speech synthesizer 240. In this manner, user-interactive voice-controlled directory dialing is achieved.

In addition to noise-processing operational commands, the user's speech is also noise-processed before it is coupled to transmit path 265 via transmit audio line 215. Hence, noise processor 210 provides noise suppression information for the speech recognizer as well as a noise-suppressed speech signal for the transmitter audio. Accordingly, the performance of the control system's speech recognition process as well as the quality of the transmitted audio signal are substantially improved.

Although speech recognition and speech synthesis allow a vehicle operator to keep both eyes on the road, a conventional handset or hand-held microphone prohibits him from keeping both hands on the steering wheel or from executing proper manual (or automatic) transmission shifting. For this reason, the control system of FIG. 3 incorporates a speakerphone to provide hands-free control of the speech communications terminal. The speakerphone performs the transmit/receive audio switching function, as well as the received/reply audio multiplexing function.

Figure 3:
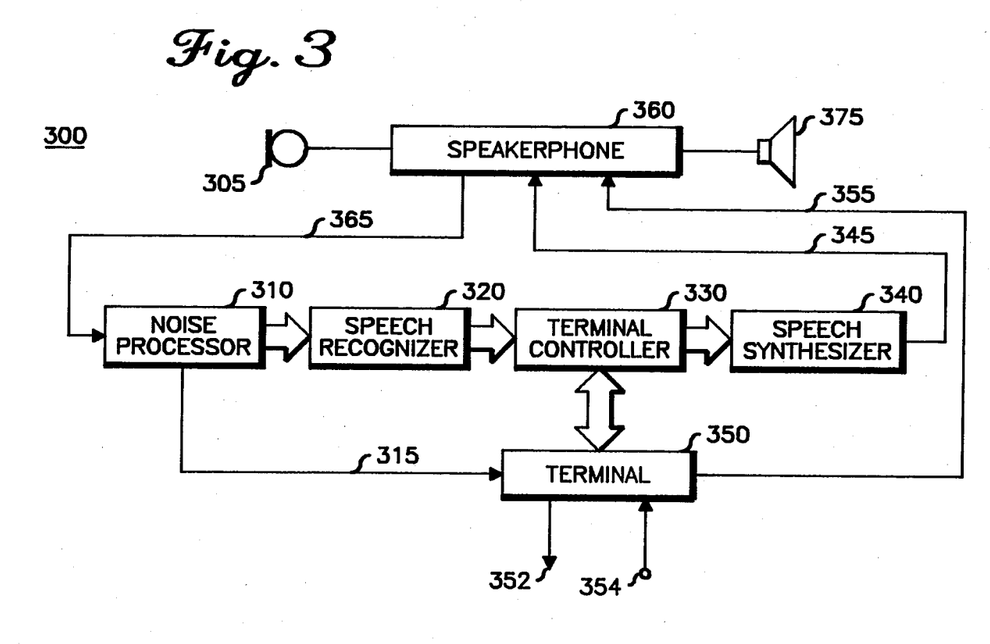
FIG. 3 is a block diagram of a speech communications terminal control system according to the present invention employing a hands-free speakerphone.

Referring now to FIG. 3, control system 300 utilizes the same noise processor block 310, speech recognizer block 320, terminal controller block 330, speech synthesizer block 340 and speech communications terminal 350 as the corresponding blocks of FIG. 2. However, microphone 305 and speaker 375 are not an integral part of the terminal 350. Instead, speakerphone 360 directs input speech signal from microphone 305 to noise processor 310 via input signal line 365. This input signal line may be switched in the case of a simplex speakerphone, or may be directly coupled in the case of a duplex speakerphone. Speakerphone 360 also controls the multiplexing of speech reply line 345 and receive audio line 355 to speaker 375. A more detailed description of the switching/multiplexing configuration of the speakerphone is described later in conjunction with FIG. 4.

Hence, FIG. 3 illustrates the application of the present invention control system to a speech communications terminal employing a speakerphone to free the user's hands. In the preferred embodiment, spectral subtraction noise suppression is utilized to process the input speech for speech recognition as well as for the transmitted audio path. A further improvement to control system 300 may be realized by using noise-suppressed speech for the speakerphone audio switching. In a high noise environment, this technique provides a significant performance increase to simplex vehicular speakerphones. Thus, the noise processing block then performs three functions: improving speech recognition performance; improving transmitted voice quality; and improving speakerphone audio switching.

Figure 4:
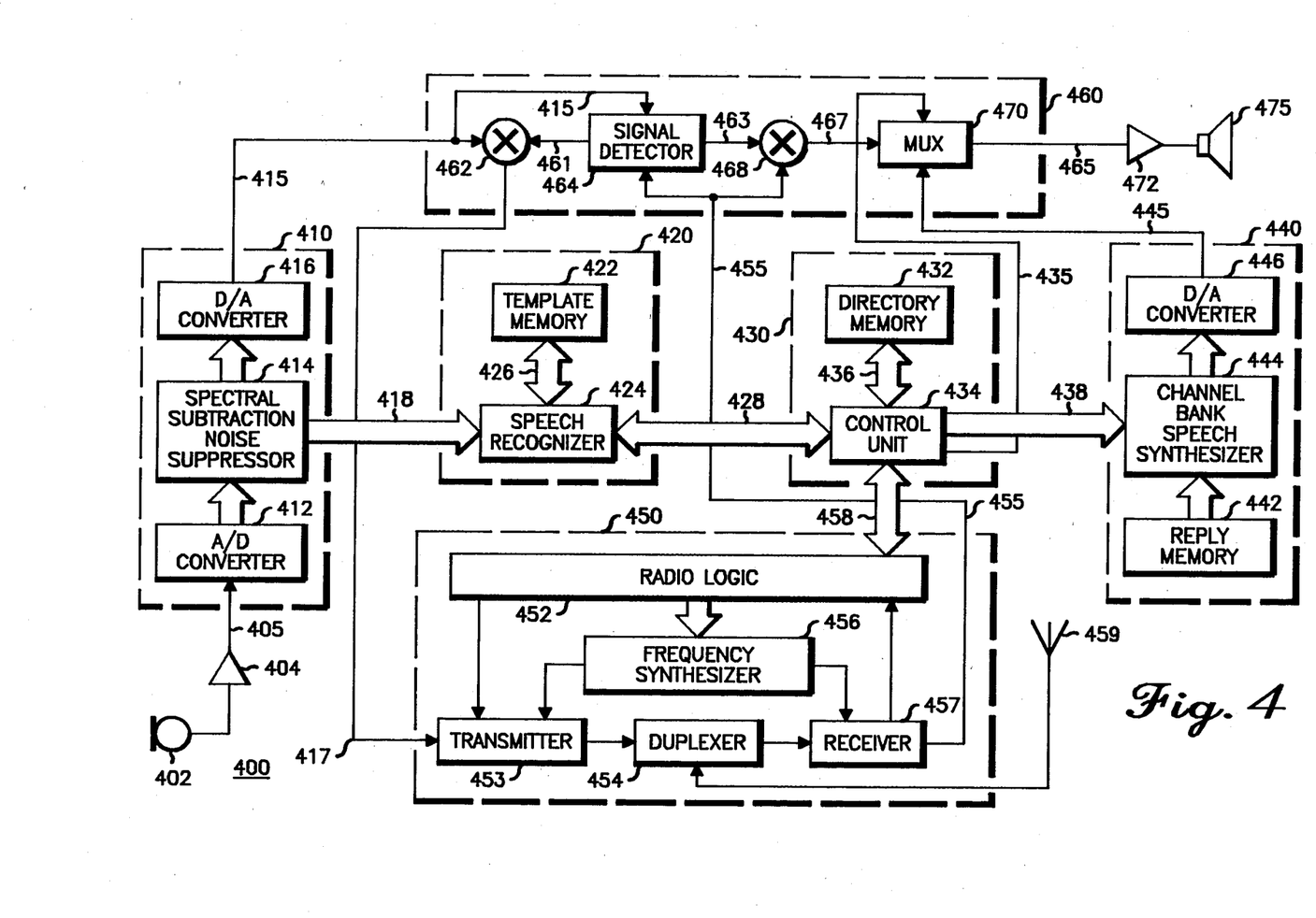
FIG. 4 is a detailed block diagram of an embodiment of the present invention incorporating a mobile radiotelephone hands-free control system with a vehicular speakerphone.

FIG. 4 is a detailed block diagram of the hands-free control system of the present invention. In general, the control system arrangement is the same as that of FIG. 3, with the above-mentioned exception that the input speech signal from the microphone is first noise-processed before being applied to the speakerphone. Microphone 402, which is typically remotely-mounted at a distance from the user's mouth (i.e., on the automobile sun visor), acoustically couples the user's voice to control system 400. This speech signal is generally amplified by preamplifier 404 to provide input speech signal 405.

Noise processor block 410 first converts the analog input speech signal to digital form at analog-to-digital converter 412. This digital data is then applied to spectral subtraction noise suppressor 414, which performs the actual dynamic noise suppression function. Any dynamic noise suppression implementation may be utilized in block 414, however, the present embodiment utilizes a particular form of spectral subtraction noise suppression—the channel filter-bank technique. Under this approach, the audio input signal spectrum is divided into individual spectral bands by a bank of bandpass filters, and particular spectral bands are attenuated according to their noise energy content.

The value of the attenuation is dependent upon the signal-to-noise ratio (SNR) of the detected signal. The SNR is calculated from a background noise estimate for that channel and a channel energy estimate. When voice is present in an individual channel, the channel signal-to-noise ratio will be high. Thus, the noise suppressor increases the gain for that particular channel. The amount of the gain rise is a function of the estimated SNR—the greater the SNR, the more the individual channel gain will be raised from the base gain (all noise). If only noise is present in the individual channel, the SNR will be low, and the gain for that channel will be reduced to the base gain. Since voice energy does not appear in all of the channels at the same time, the channels containing a low voice energy level (mostly background noise) will be suppressed (subtracted) from the voice energy spectrum. A spectral subtraction noise suppression prefilter of this type is described in R. J. McAulay and M. L. Malpass, "Speech Enhancement Using a Soft-Decision Noise Suppression Filter," *IEEE Trans. Acoust., Speech, Signal Processing*, vol. ASSP-28, no. 2, (April 1980), pp. 137–145.

Noise suppressor 414 provides noise suppression data 418 for use by speech recognition block 420. This noise suppression data may consist of actual noise-suppressed speech, or alternatively may represent spectral subtraction noise suppression parameters to be incorporated into the speech recognition algorithm. In the first case, speech recognizer 424 would be performing speech recognition upon noise-suppressed speech itself. In the latter case, speech recognizer 424 would simply utilize the noise suppression data to compensate for the background noise in the speech recognition process. In the present embodiment, this noise suppression data includes channel filter-bank data (signal information), a per-channel background noise estimate of the input speech signal (noise information), and noise-processed signal energy with the current background noise energy level (word boundary information). This signal, noise, and word boundary information is utilized during speech recognition to adjust the word-matching process to compensate for high background noise levels. Other background noise compensation algorithms for speech recognition may also be used, such as those described in the article by J. Peckham, J. Green, J. Canning, and P. Stevens, entitled "A Real-Time Hardware Continuous Speech Recognition System," *IEEE International Conference on Acoustics, Speech, and Signal Processing,* May 3-5 1982, vol. 2, pp. 863-866, and the references contained therein. In either case, noise processing results in a considerable improvement in speech recognition performance.

In the present embodiment, an 8-bit microcomputer performs the function of speech recognizer 424, and an EEPROM functions as template memory 422. Moreover, several other control system blocks of FIG. 4 are implemented in part by the same microcomputer with the aid of a CODEC/FILTER and a DSP (digital signal processor). The above referenced article describes still another microprocessor architecture. Hence, the present invention is not limited to any specific hardware or any specific type of speech recognition. More particularly, the present invention contemplates the use of: speaker dependent or speaker independent speech recognition; isolated or continuous word recognition; and a software-based or hardware-based implementation.

Template memory 422 stores word templates to be matched to the incoming speech in speech recognizer 424. During training, speech recognizer 424 is instructed by the control unit to send word templates to template memory 422 via memory bus 426. During recognition, speech recognizer 424 compares the previously stored templates from memory 422 against noise-processed speech information. The recognition algorithm of the present embodiment incorporates near-continuous speech recognition, dynamic time warping, energy normalization, and a Chebyshev distance metric to determine a template match. Prior art recognition algorithms, such as described in J. S. Bridle, M. D. Brown, and R. M. Chamberlain, "An Algorithm for Connected Word Recognition," *IEEE International Conference on Acoustics, Speech, and Signal Processing,* May 3-5 1982, vol. 2, pp. 899-902, may also be used. On the whole, speech recognition block 420 utilizes background noise information from noise processor block 410 to increase speech recognizer performance in a high background noise environment.

Controller block 430, consisting of control unit 434 and directory memory 432, serves to interface speech recognition block 420 and speech synthesis block 440 to radiotelephone 450 via interface busses 428, 438 and 458 respectively. Control unit 434 is typically a controlling microprocessor which is capable of interfacing data from radio logic 452 to the other blocks. Control unit 434 also performs operational control of radiotelephone 450, such as: unlocking the control head; placing a telephone call; ending a telephone call; etc. Depending on the particular hardware interface structure to the radio, control unit 434 may incorporate other sub-blocks to perform specific control functions as DTMF dialing, interface bus multiplexing, and control-function decision-making. Directory memory 432, an EEPROM, stores the plurality of telephone numbers and names, thereby permitting directory dialing. Memory bus 436 sends information to directory memory 432 during the process of entering telephone names and numbers, and provides this stored directory information to control unit 434 in response to the recognition of a valid directory dialing command. Depending on the particular telephone device used, it may be more economical to incorporate directory memory 432 into the telephone device itself. In general, however, controller block 430 performs the telephone directory storage function, the telephone number dialing function, and the radio operational control function.

Controller block 430 also provides status information representing the operating status of the radiotelephone. This status information may include information as to the names and telephone numbers stored in directory memory 432 ("Office", "555-1234", etc.), directory status information ("Directory Full", "Name?", etc.), speech recognition status information ("Ready", "User Number?", etc.), or radiotelephone status information ("Call Dropped", "System Busy", etc.). Hence, controller block 430 is the heart of the user-interactive speech recognition/speech reply control system of the radio.

Speech synthesis block 440 performs the voice reply function. Voice reply data is fed to channel bank speech synthesizer 444 via interface bus 438. Using this information, speech synthesizer 444 recalls reply words from reply memory 442, synthesizes these reply words, and outputs them to digital-to-analog converter 446. The voice reply is then routed to the user. In the present embodiment, channel bank speech synthesizer 444 is the speech synthesis portion of a 19-channel vocoder. An example of such a vocoder may be found in J. N. Holmes, "The JSRU Channel Vocoder", *IEE PROC.,* vol. 127, pt. F, no. 1, (February, 1980), pp. 53-60. The information provided by supply memory 442 may also include whether the input speech frame should be voiced or unvoiced, the pitch rate if any, and the gain of each of the 19 filters. However, as will be obvious to those skilled in the art, any speech synthesis apparatus may be utilized. Furthermore, the present invention contemplates that any means of providing a reply to the user would perform the basic reply function of speech synthesizer block 440. For example, a visual indication (such as a display light) or an audible indication (such as a reply tone) may be substituted.

As we have seen, the present invention teaches the implementation of noise suppression with speech recognition and speech synthesis to provide a user-interactive control system for a speech communications device. In the present embodiment, the speech communications device is a radio transceiver, such as a cellular mobile radiotelephone. However, any speech communications device warranting hands-free user-interactive operation in a noisy environment may be used. For example, any simplex radio transceiver requiring hands-free control may also take advantage of the improved control system of the present invention.

Referring now to radiotelephone block 450 of FIG. 4, radio logic 452 performs the actual radio operational control function. Specifically, it directs frequency synthesizer 456 to provide channel information to transmitter 453 and receiver 457. The function of frequency synthesizer 456 may also be performed by crystal-controlled channel oscillators. Duplexer 454 interfaces transmitter 453 and receiver 457 to a radio frequency (RF) channel via antenna 459. In the case of a simplex radio transceiver, the function of duplexer 454 may be performed by an RF switch. For a more detailed explanation of representative radio transceiver circuitry, refer to Motorola Instruction Manual 68P81066E40 entitled "DYNA T.A.C. Cellular Mobile Telephone."

Speakerphone 460, also termed a VSP (vehicular speakerphone) in the present application, provides: hands-free acoustic coupling of the user-spoken audio to the control system; the synthesized speech reply signal to the user; and the received audio from the radiotelephone to the user. As previously mentioned, noise processor block 410 performs spectral subtraction noise suppression upon the input speech signal 405, to produce noise suppression information for speech recognition. This information is also used by digital-to-analog converter 416 which produces noise-suppressed microphone audio 415. The noise-suppressed speech signal is applied to VSP transmit audio switch 462, which routes noise-suppressed microphone audio 415 to radio transmitter 453 via transmit audio 417. VSP transmit switch 462 is controlled by VSP signal detector 464. Signal detector 464 compares microphone audio 415 against receive audio 455 to perform the VSP switching function.

When the mobile radio user is talking, signal detector 464 provides a positive control signal via detector output 461 to close transmit audio switch 462, and a negative control signal via detector output 463 to open receive audio switch 468. Conversely, when the landline party is talking, signal detector 464 provides the opposite polarity signals to close receive audio switch 468, while opening transmit audio switch 462. When the receive audio switch is closed, receiver audio 455 from radiotelephone receiver 457 is routed through receive audio switch 468 to multiplexer 470 via switched receive audio output 467. In some communications systems, it may prove advantageous to replace audio switches 462 and 468 with variable gain devices that provide equal but opposite attenuations in response to the control signals from the signal detector. In either case, the use of noise-suppressed microphone audio 415, as opposed to input speech signal 405, assists signal detector 464 in making accurate audio path control decisions. Hence, the noise suppression/speakerphone configuration of FIG. 4 significantly improves the noise falsing and desensitization performance of a vehicular speakerphone.

Multiplexer 470 switches between voice reply audio 445 and switched receive audio 467 in response to multiplex signal 435 from control unit 434. Whenever the control unit sends status information to the speech synthesizer, multiplexer signal 435 directs multiplexer 470 to route the voice reply audio to the speaker. VSP audio 465 is usually amplified by audio amplifier 472 before being applied to speaker 475. The vehicle speakerphone embodiment described herein is only one of numerous possible configurations. It should be emphasized, however, that the present invention teaches the technique of utilizing noise-suppressed microphone audio for the VSP audio switching. This technique provides a notable improvement in speakerphone performance.

In summary, FIG. 4 illustrates a radiotelephone having a hands-free user-interactive speech-recognizing control system for controlling radiotelephone operating parameters upon a user-spoken command. The control system provides audible feedback to the user via speech synthesis as to the radiotelephone operating status. The vehicle speakerphone provides hands-free acoustic coupling of the user-spoken input speech to the control system, the speech reply signal from the control system to the user, and the receiver audio to the user. The implementation of noise processing to the control system improves the performance of the radiotelephone's speech recognition, the voice quality of the transmitted audio, and the audio switching operation of the vehicular speakerphone. The combination of noise suppression, speech recognition, and speech synthesis provides a substantial improvement to prior art control systems.

While specific embodiments of the present invention have been shown and described herein, further modifications and improvements may be made by those skilled in the art. All such modifications which retain the basic underlying principles disclosed and claimed herein are within the scope of this invention.

What is claimed is:

1. A speech communications device having a transmit path, a receive path, and a user-interactive control system for controlling device operating parameters, said control system comprising:
   means for dynamically suppressing background noise from an input speech signal to produce noise suppression information;
   means responsive to said noise suppression information for recognizing user-spoken command words to produce device control data;
   means responsive to said control data for controlling said device operating parameters, and for producing device status data representing the operating status of said speech communications device; and
   means responsive to said status data for providing an indication to the user as to the speech communications device operating status.

2. The speech communications device according to claim 1, wherein said background noise suppressing means includes:
   means for generating a noise-suppressed speech signal in response to said noise suppression information; and
   means for coupling said noise-suppressed speech signal to said speech communications device transmit path.

3. The speech communications device according to claim 1, further comprising means for placing a telephone call by voice command, the placement of which constitutes one of said operating parameters.

4. The speech communications device according to claim 3, wherein said controlling means includes:
   directory means for storing a plurality of telephone numbers; and
   dialing means for dialing telephone numbers obtained from said directory means in response to recognition of a predetermined verbal command.

5. The speech communications device according to claim 4, further comprising means for storing a telephone number in said directory means by voice command, the storage of which constitutes one of said operating parameters.

6. The speech communications device according to claim 1, wherein said indication providing means is a speech synthesizer which synthesizes a verbal reply based upon said device status data.

7. The speech communications device according to claim 1, wherein said background noise suppressing means uses the spectral gain modification noise suppression technique.

8. The speech communications device according to claim 1, further comprising radio frequency (RF) communication means for transmitting information carried by said transmit path and for receiving information and for coupling said received information to said receive path.

9. A radio communications apparatus having a transmitter, a receiver, and a speech-recognizing control system, said control system comprising:
means for dynamically suppressing background noise from an input speech signal to produce noise suppression information;
means responsive to said noise suppression information for recognizing user-spoken command words to produce voice command data;
means responsive to said voice command data for controlling operating functions of said radio communications apparatus, and for producing voice reply data indicative of the operating status of said radio communications apparatus; and
means for synthesizing a speech reply signal from said voice reply data, thereby providing an audible indication to the user as to the radio communications apparatus operating status.

10. The radio communications apparatus according to claim 9, wherein said radio communications apparatus is a mobile radiotelephone.

11. The radio communications apparatus according to claim 9, wherein said background noise suppressing means includes:
means for generating a noise-suppressed speech signal in response to said noise suppression information; and
means for coupling said noise-suppressed speech signal to said radio communications apparatus transmitter.

12. The radio communications apparatus according to claim 10, further comprising means for placing a telephone call by voice command, the placement of which constitutes one of said operating functions.

13. The radio communications apparatus according to claim 12, wherein said controlling means includes:
directory means for storing a plurality of telephone numbers; and
dialing means for dialing telephone numbers obtained from said directory means in response to recognition of a predetermined verbal command.

14. The radio communications apparatus according to claim 13, further comprising means for storing a telephone number in said directory means by voice command, the storage of which constitutes one of said operating functions.

15. The radio communications apparatus according to claim 9, wherein said background noise suppressing means uses the spectral gain modification noise suppression technique.

16. The radio communications apparatus according to claim 9, wherein said noise suppression information includes channel-bank information and at least one background noise estimate of said input speech signal.

17. The radio communications apparatus according to claim 9, further comprising means for hands-free acoustic coupling said user-spoken command words to said input speech signal, said speech reply signal to the user, and an audio signal from said radio receiver to the user.

18. The radio communications apparatus according to claim 17, wherein said hands-free acoustic coupling means is a speakerphone.

19. A radio transceiver having a transmitter, a receiver, and a hands-free user control means for controlling a plurality of user-controlled radio transceiver operating parameters upon a user-spoken command word, and for providing audible feedback to the user as to the radio transceiver operating status, said control means comprising:
first coupling means for providing hands-free acoustic coupling of user-spoken input speech to said control means, thereby providing an input speech signal;
means for dynamically suppressing background noise from said input speech signal by spectral gain modification, thereby providing noise suppression data;
means responsive to said noise suppression data for recognizing a plurality of predetermined user-spoken command words to provide voice command data, said plurality of predetermined command words corresponding to said plurality of radio transceiver operating parameters;
means responsive to said voice command data for controlling said radio transceiver operating parameters, and for producing radio status data indicative of the present operating status of said radio transceiver;
means for synthesizing a speech reply signal from said radio status data; and
second coupling means for providing hands-free acoustic coupling of said speech reply signal from said control means to said user, thereby providing audible feedback to the user as to said radio transceiver present operating status.

20. The radio transceiver according to claim 19, wherein said radio transceiver is a mobile radiotelephone.

21. The radio transceiver according to claim 19, wherein said background noise suppressing means includes:
means for generating a noise-suppressed speech signal in response to said noise suppression data; and
means for coupling said noise-suppressed speech signal to said radio transmitter.

22. The radio transceiver according to claim 20, further comprising means for placing a telephone call by voice command, the placement of which constitutes one of said plurality of operating parameters.

23. The radio transceiver according to claim 22, wherein said controlling means includes:
directory means for storing a plurality of telephone numbers; and
dialing means for dialing telephone numbers obtained from said directory means in response to recognition of a predetermined verbal command.

24. The radio transceiver according to claim 23, further comprising means for storing a telephone number in said directory means by voice command, the storage of which constitutes one of said plurality of operating parameters.

25. The radio transceiver according to claim 19, wherein said noise suppression data includes channel-bank information and at least one background noise estimate of said input speech signal.

26. The radio transceiver according to claim 19, further comprising third coupling means for providing hands-free acoustic coupling of a received signal from said radio receiver to said user.

27. The radio transceiver according to claim 26, wherein said first, second, and third coupling means comprise a speakerphone.

28. The radio transceiver according to claim 19, wherein said radio transceiver operating status includes information as to the names and telephone numbers stored in said directory means, said status information being user-accessible by voice command.

29. The method of controlling a radio communications apparatus having a transmitter, a receiver, and a speech-recognizing control system, comprising the steps of:
dynamically suppressing background noise from an input speech signal to produce noise suppression information;
recognizing user-spoken command words in response to said noise suppression information to produce voice command data;
controlling operating functions of said radio communications apparatus in response to said voice command data, and producing voice reply data indicative of the operating status of said radio communications apparatus; and
synthesizing a speech reply signal from said voice reply data, thereby providing an audible indication to the user as to the radio communications apparatus operating status.

30. The method according to claim 29, wherein said radio communications apparatus is a mobile radiotelephone.

31. The method according to claim 29, further comprising the steps of:
generating a noise-suppressed speech signal in response to said noise suppression information; and
coupling said noise-suppressed speech signal to said radio communications apparatus transmitter.

32. The method according to claim 30, wherein said operating functions include placing a telephone call by voice command.

33. The method according to claim 32, further comprising the steps of:
storing a plurality of telephone numbers in a stored telephone number directory; and
dialing telephone numbers obtained from said directory in response to recognition of a predetermined verbal command.

34. The method according to claim 33, wherein said operating functions further include storing a telephone number in said directory by voice command.

35. The method according to claim 29, wherein said background noise suppressing step uses the spectral gain modification noise suppression technique.

36. The method according to claim 29, wherein said noise suppression information includes channel-bank information and at least one background noise estimate of said input speech signal.

37. The method according to claim 29, further comprising the steps of:
acoustically coupling said user-spoken command words to said input speech signal;
acoustically coupling said speech reply signal to the user; and
acoustically coupling an audio signal from said radio receiver to the user.

38. The method according to claim 37, wherein said acoustic coupling steps are performed by a speakerphone.

39. The method of controlling a radio transceiver having a transmit audio path, a receive audio path, a plurality of operating parameters, and a plurality of operating states, by speech recognition and speech reply, comprising the steps of:
providing hands-free acoustic coupling of input speech spoken by a user to said radio transceiver, thereby providing an input speech signal;
dynamically suppressing background noise from said input speech signal by spectral gain modification, thereby providing noise suppression data;
recognizing a plurality of predetermined verbal command words in response to said noise suppression data to provide voice command data, said plurality of predetermined verbal command words corresponding to said plurality of operating parameters;
controlling said radio transceiver operating parameters in response to said voice command data, and producing radio status data indicative of the present operating state of said radio transceiver;
synthesizing a speech reply signal from said radio status data; and
providing hands-free acoustic coupling of said speech reply signal from said radio transceiver to said user, thereby producing audible feedback of said present operating state of said radio transceiver.

40. The method according to claim 39, wherein said radio transceiver is a mobile radiotelephone.

41. The method according to claim 39, further comprising the steps of:
generating a noise-suppressed speech signal in response to said noise suppression data; and
coupling said noise-suppressed speech signal to said radio transmitter.

42. The method according to claim 40, wherein said plurality of operating parameters includes placing a telephone call by voice command.

43. The method according to claim 42, further comprising the steps of:
storing a plurality of telephone numbers in a stored telephone number directory; and
dialing telephone numbers obtained from said directory in response to recognition of a predetermined verbal command.

44. The method according to claim 43, wherein said plurality of operating parameters further includes storing a telephone number in said directory by voice command.

45. The method according to claim 39, wherein said noise suppression data includes channel-bank information, and at least one background noise estimate of said input speech signal.

46. The method according to claim 39, further comprising the step of providing hands-free acoustic coupling of a received signal from said receive audio path to said user.

47. The method according to claim 46, wherein said acoustic coupling steps are performed by a speakerphone.

48. The method according to claim 39, wherein said said radio transceiver operating status includes information as to the names and telephone numbers stored in said telephone number directory, said status information being user-accessible by voice command.

* * * * *